United States Patent
Gebing

(10) Patent No.: US 12,152,390 B2
(45) Date of Patent: Nov. 26, 2024

(54) THERMAL AND/OR ACOUSTIC INSULATION SYSTEM AS WATERPROOFING FOR A FLAT OR A FLAT INCLINED ROOF OF A BUILDING AND METHOD FOR PRODUCING A THERMAL AND/OR ACOUSTIC INSULATION SYSTEM AS WATERPROOFING

(71) Applicant: Rockwool A/S, Hedehusene (DK)

(72) Inventor: Andreas Gebing, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 402 days.

(21) Appl. No.: 17/428,681

(22) PCT Filed: Jan. 28, 2020

(86) PCT No.: PCT/EP2020/051978
§ 371 (c)(1),
(2) Date: Aug. 5, 2021

(87) PCT Pub. No.: WO2020/164900
PCT Pub. Date: Aug. 20, 2020

(65) Prior Publication Data
US 2022/0251845 A1  Aug. 11, 2022

(30) Foreign Application Priority Data
Feb. 15, 2019  (EP) .................................. 19157446

(51) Int. Cl.
| | | |
|---|---|---|
| *E04D 11/02* | (2006.01) |
| *B32B 5/02* | (2006.01) |
| *B32B 7/02* | (2019.01) |
| *B32B 7/12* | (2006.01) |
| *B32B 11/10* | (2006.01) |
| *E04D 5/14* | (2006.01) |

(52) U.S. Cl.
CPC .............. *E04D 11/02* (2013.01); *B32B 5/02* (2013.01); *B32B 7/02* (2013.01); *B32B 7/12* (2013.01);
(Continued)

(58) Field of Classification Search
CPC ...... E04D 5/148; E04D 11/02; B32B 2419/06
See application file for complete search history.

(56) References Cited

U.S. PATENT DOCUMENTS

| | | | | |
|---|---|---|---|---|
| 9,889,639 B2 * | 2/2018 | Nielsen | ................. | D04H 1/4218 |
| 2008/0250741 A1 * | 10/2008 | Bennett | ................... | E04B 1/942 |
| | | | | 252/607 |

(Continued)

FOREIGN PATENT DOCUMENTS

| | | | |
|---|---|---|---|
| DE | 10006637 A1 * | 8/2001 | |
| EP | 2085415 A1 * | 8/2009 | |

(Continued)

OTHER PUBLICATIONS

Rockwool Limited: "Flat Roof Application Guide", Jun. 1, 2017 (Jun. 1, 2017), XP055601831, Retrieved from the Internet: URL:https://cdn01.rockwool.co.uk/siteassets/rw-uk/literature-downloads/brochures/flat-roof-application-guide.pdf?f=20180823111817 [retrieved on Jul. 3, 2019], pp. 4-5, 12-13.

(Continued)

*Primary Examiner* — Christine T Cajilig
(74) *Attorney, Agent, or Firm* — Harness, Dickey & Pierce, P.L.C.

(57) ABSTRACT

The disclosure relates to a thermal and/or acoustic insulation system as waterproofing for a flat or flat inclined outside surface of a building, especially for a flat roof or a flat inclined roof, consisting of at least one insulation element made of mineral wool, preferably made of stone wool, and having a major surface, and a lining element consisting of at least a first layer made of lining material and a second layer made of a glue activatable by heat and oriented to the major surface of the insulation element, whereby the major surface of the insulation element is free of protrusions, especially flights, and cavities thereby being planar and whereby the area connection between the insulation element and the (Continued)

Figure 1:
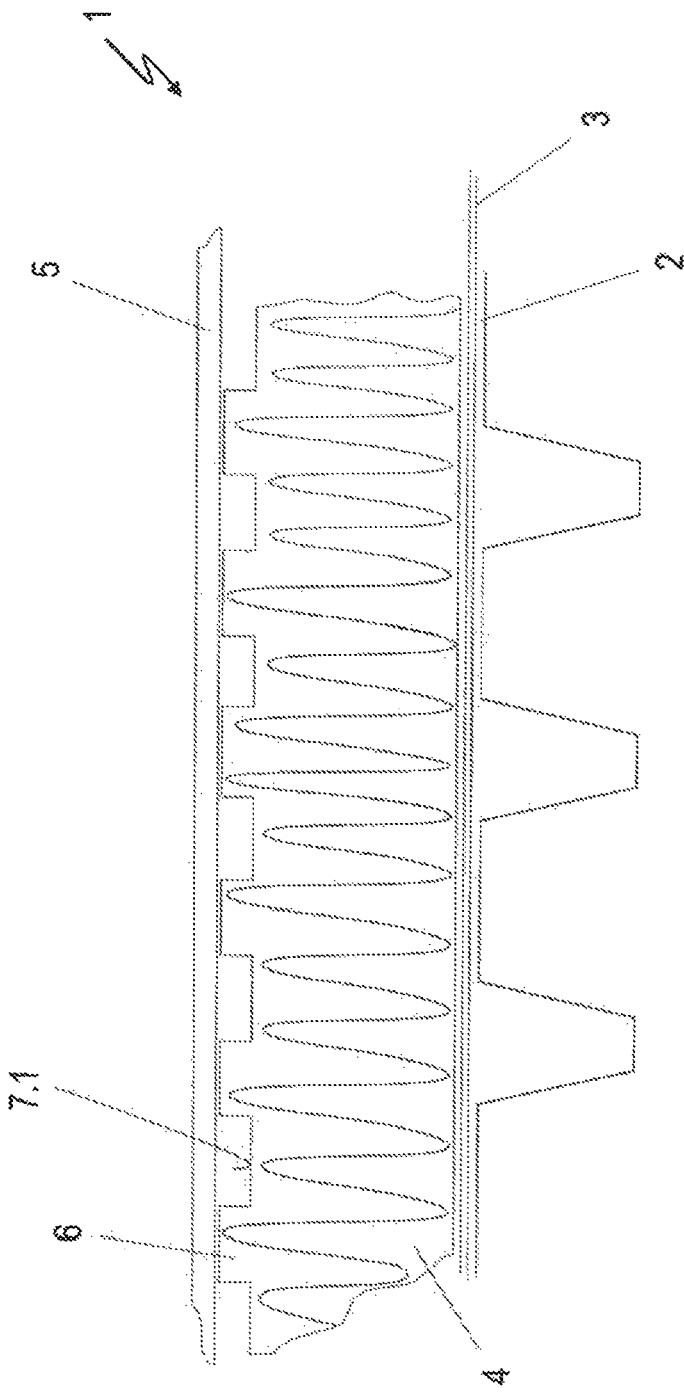

lining element is at least 70%, preferably at least 80% of the major surface area of the insulation element.

14 Claims, 6 Drawing Sheets

(52) U.S. Cl.
CPC .............. *B32B 11/10* (2013.01); *E04D 5/148* (2013.01); *B32B 2262/108* (2013.01); *B32B 2307/102* (2013.01); *B32B 2307/304* (2013.01); *B32B 2307/7246* (2013.01); *B32B 2307/7265* (2013.01); *B32B 2419/06* (2013.01)

(56) References Cited

U.S. PATENT DOCUMENTS

2010/0000170 A1* 1/2010 Parks ..................... B32B 7/06
52/746.1
2020/0299966 A1* 9/2020 Tang ..................... E04D 5/08
2020/0378109 A1* 12/2020 Bindschedler .......... E04C 2/243

FOREIGN PATENT DOCUMENTS

| WO | WO-8101816 A1 * | 7/1981 |
| WO | 9831895 A1 | 7/1998 |
| WO | WO-0196678 A2 * | 12/2001 |
| WO | 2013034376 A1 | 3/2013 |

OTHER PUBLICATIONS

Assanpanel: "Rockwool", Apr. 17, 2017 (Apr. 17, 2017), XP055602020, Retrieved from the Internet: URL:https://www.assanpanel.com.tr/kutuphane/pdf?pdf=http://www.assanpanel.com.tr/en/media/files/pdf/kutuphane/malzeme-spesifikasyonlari/en/ta-yn-spesifikasyonu [retrieved on Jul. 3, 2019] the whole document.

* cited by examiner

THERMAL AND/OR ACOUSTIC INSULATION SYSTEM AS WATERPROOFING FOR A FLAT OR A FLAT INCLINED ROOF OF A BUILDING AND METHOD FOR PRODUCING A THERMAL AND/OR ACOUSTIC INSULATION SYSTEM AS WATERPROOFING

CROSS-REFERENCE TO RELATED APPLICATIONS

This application is a U.S. National Phase Application under 35 U.S.C. 371 of International Application No. PCT/EP2020/051978, filed on Jan. 28, 2020, which claims the benefit of European Patent Application No. 19157446.6, filed on Feb. 15, 2019. The entire disclosures of the above applications are incorporated herein by reference.

FIELD

The disclosure relates to a thermal and/or acoustic insulation system as waterproofing for a flat or flat inclined outside surface of a building, especially for a flat or flat inclined roof, consisting of at least one insulation element made of mineral wool, preferably made of stone wool, and having a major surface, and a lining element. Furthermore, the disclosure relates to a method for producing a thermal and/or acoustic insulation system as waterproofing for a flat or flat inclined outside surface of a building, especially for a flat for flat inclined roof, consisting of at least one insulation element made of mineral wool, preferably made of stone wool and having a major surface, and a lining element.

BACKGROUND

This section provides background information related to the present disclosure which is not necessarily prior art.

Flat roofs and flat inclined roofs are well known in the prior art, e.g. as membrane roof systems which are generally divided into the following types, according to the position in which the principal thermal insulation is placed: warm roofs, inverted warm roofs, roof gardens or green roofs, and cold roofs.

Membrane roof systems are used to protect flat roofs or flat inclined roofs from all weather conditions likely to be experienced during their design life. They are often build as single ply roofing systems, in particular for larger roofs, or they are built up of bituminous membranes, in particular reinforced bitumen membranes (RBM). The latter are based on a carrier normally polyester and coated in bitumen, mostly two different layers of bitumen with varying softening performance. They are typically applied in two or more layers of sheet materials rolled out over the thermal and/or acoustic insulation element.

A typical membrane roof system comprises: a structural support, a deck providing continuous support, a vapor control layer (if required), thermal and/or acoustic insulation (if required), a waterproof membrane or lining and a traffic or load resistant finish (if required for functional and/or aesthetic reasons). In warm roofs the principal thermal and/or acoustic insulation element is placed immediately below the roof covering, namely the waterproof membrane or lining. The three principal options for securing roofing systems against wind loads are mechanical fastening, adhesion/hot bonding/cold gluing, ballast, whereby the insulation element and the membrane maybe either attached by the same or a different method.

Preferably, the single ply waterproof membrane or waterproof lining is attached to the substrate, i.e. the insulation layer, by cold gluing using a suitable cold adhesive.

Whereas reinforced bitumen membranes (RBM) are typically applied by torching. In this method specially designed bituminous membranes are heated from their bottom side with a gas torch in order to liquefy some of the bitumen and no separate bonding bitumen or glue is needed. Torching requires special measures and precautions against fire, and is not suitable over or adjacent to flammable materials.

Cold gluing requires a particularly adequate surface, preferably a planar surface which ought to limit the consumption of adhesive being used. Torching of reinforced bitumen membranes directly onto e.g. mineral wool insulation elements requires a certain amount of liquefiable bitumen, i.e. a certain thickness of the lower bituminous layer, to sufficiently adhere to said insulation elements, in particular when choosing mineral wool insulation elements which naturally comprise an uneven surface respectively protrusions as a result of their production.

Therefore, state of the art roofing systems make use of tissue and fabric faced outer bitumen coated roof insulation boards to provide an adequate surface of the insulation layer for the gluing/bonding of the waterproof lining. These systems can be used for both cold gluing of single ply roofing but also for torched on bitumen membranes. These systems however have the disadvantage that adhesives or liquefied bitumen may disperse into the insulation layer. Thus, significantly decreasing the insulation and/or damping characteristics of said insulation layer. Moreover, dispersed adhesive or bitumen will result in higher consumption and uncontrolled bonding strength thus causing higher system costs. Furthermore, such adhesives or said bitumen substantially reduce the fire resistance of the roof insulation system.

WO 2013/034376 A1 discloses for example an insulation element for thermal and/or acoustic insulation of a flat roof or a flat inclined roof comprising a first layer made of mineral fibers, especially stone wool fibers, a second layer made of at least fabric, especially a fleece being impregnated, whereby the second layer is fixed to a major surface of the first layer by an adhesive, whereby the second layer is impregnated with a filler and whereby the second layer in combination with the filler has a permeability allowing hot air gases to pass through the second layer and closing the second layer for penetration of a glue or adhesive in the direction to the first layer.

Furthermore, WO 98/31895 discloses a flat roof composite comprising a resin-impregnated mineral fiber layer, a fabric layer with impregnated adhesive throughout the layer, the adhesive penetrating also into the surface of the mineral fiber layer, and a moisture impermeable sheet adherent here to the fabric layer by the adhesive. The fabric is preferably formed of woven strands of glass fiber filaments. The fabric is united with the mineral wool insulating core prior to passage through the curing oven which cures the binder applied to the fibers in the spinning chamber. The size of the apertures between strands and glass fiber filaments is selected so as to allow penetration of liquid adhesive into the mineral wool and reduces delamination of the water impermeable sheet.

Both systems described in the prior art are useful for flat or flat inclined roofs of buildings. Nevertheless, both systems are cost intensive as the insulation element has to be prepared by using facings and coatings before these insulation elements are used in situ on top of the buildings. This means that the insulation elements may have a high weight due to the additional coatings and are expensive in their production.

Alternatively, where reinforced bitumen membranes are directly torched onto e.g. mineral wool insulation elements, the resulting wind load resistance is low since the connection to the untreated surface of the mineral wool insulation elements is poor. By way of example, reference is made to a commercially available product or system offered by German based company C. Hasse & Sohn, the respective product named "Hasse Fusion MF". The wind load resistance of the bonded system measured in accordance with the Guideline ETAG No. 006 is stated with 2.500 N/m².

SUMMARY

This section provides a general summary of the disclosure, and is not a comprehensive disclosure of its full scope or all of its features.

A new thermal and/or acoustic insulation system as waterproofing for a flat or flat inclined outside surface of a building according to the present disclosure consists of at least one insulation element made of mineral wool, preferably of stone wool, and having a major surface, and a lining element. The lining element referred to in the sense of the present disclosure constitutes the first layer of the waterproofing system being applied onto the insulation element layer. Such lining element consists of at least a first layer made of lining material and a second layer made of a glue or an adhesive activatable by heat, e.g. torching, and oriented towards the major surface of the insulation element, whereby the major surface of the insulation element is free of protrusions, especially flights, and cavities, thereby being planar, and whereby the area connection between the insulation element and the lining element is at least 70%, preferably at least 80% of the major surface area of the insulation element.

Typically, the lining element will consist of a reinforced bitumen membrane (RBM) comprising a first layer of a bituminous material with a comparatively high softening point, and a second layer made of a bituminous layer with a low softening point and which is easily activatable by heat, e.g. torching. The softening point is the temperature at which a material softens. With respect to bituminous materials the softening point is used to determine and specify the quality of the bitumen. The higher the softening point, the higher the melting temperature of the respective material.

As a rare alternative and just by way of example, the lining element may consist of a single ply roofing membrane comprising an additional heat-activatable bottom layer of e.g. a hot melt adhesive, or comprising a bitumen material as has been described above.

An insulation element according to the present disclosure and made of mineral wool, preferably of stone wool, is to be seen in the context of European Standard EN 13162:2012, with the title "Thermal insulation products for buildings—Factory made mineral wool (MW) products".

The thermal and/or acoustic insulation system according to the disclosure has different advantages compared to the prior art. First of all, as the insulation element is free of protrusions, especially flights and of course cavities the lining element can be brought in direct contact with approximately the whole major surface area of the insulation element and is not fixed only to protrusions, namely the before-mentioned flights so that the lining element is not in contact with the surface of the insulation element between the protrusions. Such flights are the result of a hardening step in a hardening device respectively a curing oven through which the uncured insulation element, i.e. a nonwoven primary web of mineral fibers and a binder is transported thereby curing the binder. Such hardening device is normally equipped with two parallel running conveyers in a certain distance, each having several metal plates with apertures through which hot air is blown from one conveyer through the insulation element and towards the second conveyer. These metal plates are pressed onto the major surfaces of the insulation element thereby forming the flights which are represented by the fibrous material erecting through the apertures in the metal plates which cure in the same way as the other parts of the insulation element. Said apertures in the metal plates of the hardening device and at respective joints between the several metal plates amount to approximately 30% up to 40% of the surface area of said conveyers. This means that the insulation element comprises an identical amount of flights that protrude from its major surface.

Because the insulation element according to the disclosure is free of protrusions in the area of the major surface to be covered by the lining element, in order to achieve a nearly full-surface bonding it is possible to use far less adhesive or glue to connect the lining element and the insulation element. Compared to the prior art using less adhesive improves the fire resistance of the thermal and/or acoustic insulation system and furthermore the costs of producing such system.

Since less adhesive or glue or bitumen is needed to connect the lining element and the insulation element the second layer of the lining element providing the bonding can be optimized to only comprise the required amount of adhesive or glue or bitumen which is necessary to ensure proper bonding. Thus, the result is reducing the thickness of the lining element, in particular the thickness of the second layer, and the costs for production of the same.

Another aspect is the time necessary to fix the lining element on the insulation element which is massively reduced as the adhesive or glue is applied to the layer made of lining material and comes into direct contact with the insulation element. According to the prior art the adhesive, mostly bitumen is part of the lining material so that the lining material is heated to the melting temperature of the bitumen and afterwards pressed onto the insulation element thereby connecting the bituminous lining material and the insulation element. With respect to the disclosure, less energy is needed as less adhesive has to be heated.

The area connection of the lining element to the insulation element is achieved by at least a connection area of 70% of the major surface area of the insulation element. Lamellar structures are achieved as a result of heating the glue or adhesive layer strip-like and afterwards bringing the sticky adhesive in contact with the insulation element. Preferably, the lamellar connecting areas are running perpendicular to the length-wise direction of the lining element.

According to a further feature of the disclosure the insulation element has at least two layers of different bulk density whereby the layer with the higher bulk density is in contact with the lining element. Using a higher bulk density in the area of the contacting surface to the lining element has the effect that the insulation element is more dense in the area of the planar surface so that most of the adhesive can be used to connect the insulation element to the lining element avoiding that too much of the adhesive penetrates into the insulation element and can therefore not be used to build up a connection between the lining element and the insulation element. Therefore, most of the adhesive can effectively be used for the connection of the insulation element with the lining element.

According to a further feature of the disclosure the connection between the insulation element and the lining element covers 90% up to 99% of the major surface of the insulation element which improves the connection between the insulation element and the lining element and which more or less equals a full-surface bonding which is required to effectively transfer wind suction forces.

With respect to thermal and/or acoustic insulation on flat or flat inclined roofs, the so-called peeling strength or peel off strength is an important feature which provides a measure for the strength of the connection between an insulation element and a covering or lining element. With other words, the adhesion of a respective lining element on the mineral wool board is important, especially for roof boards; such roof boards in the installed state must withstand wind impacts. The peeling strength or peel off strength is tested by an internal method and shows the peeling strength which a product receives when it is bonded to a covering or lining element. By testing the peeling strength, the covering or lining element as a top layer is removed from the insulation element. The cross-sectional area of an adhesive connection is chosen to one third of the sample area. The peeling strength is measured perpendicular to the surface of the insulation element being bonded in its length with a lining element, e.g. a bitumen membrane. First the test specimen is positioned or fixed in a guide rail, so that the bitumen membrane can be peeled off vertically. I.e., the insulation element is vertically kept in place by the mentioned guide rail which is positioned at a lower traverse of a material testing machine, e.g. commercially available at ZwickRoell. Said guide rail however ensuring that the specimen can move in a horizontal direction and no additional shear forces are introduced while testing. One end of a respective bitumen membrane is clamped into a mounting fixture at an upper traverse and comprising a load cell.

The peeling strength for a given length is determined. The dimensions of the specimens are chosen to a length of 350 mm and a width of 150 mm for the insulation element, and a length of 450 mm and a width of 50 mm for the lining element. A pre-load of 2.5+/−0.25 N is applied and the lining element is torn from the insulation element with a test speed of 100+/−5 mm/min thereby giving a peeling strength measured in [N/50 mm].

Preferably the thermal and/or acoustic insulation has a peel off strength perpendicular to the major surface of the insulation element of at least 15 [N/50 mm], preferably of at least 18 [N/50 mm]. The peel off strength is measured in accordance with an internal measuring method as has been explained in more detail above.

The lining element is usually adhered to the insulation element in situ. Thus, the roof is first build in the normal way using for example panels of insulation material. Afterwards, the lining element is applied to one or more panels of insulation material by heating the second layer made of a glue or adhesive and connecting the lamellar area being heated to the major surface of the insulation element, so that the two become adherent. The improved properties of such a roofing system according to the disclosure is also dependent of the peel off strength according to the disclosure which means that a certain force perpendicular to the major surface of the insulation element is necessary to peel off the lining element from the insulation element. The before-mentioned peel off strength is sufficiently high enough to avoid peeling off during the roofs lifetime and under normal circumstances.

On the other hand such a thermal and/or acoustic insulation system may be characterized by a wind uplift resistance of at least 3.500 N/m$^2$, preferably of at least 4.000 N/m$^2$ so that such a thermal and/or acoustic insulation system can also be used in areas where high wind suction forces can be expected, such as in the area of balconies, terraces or the like in higher buildings of more than for example 10 stories. Said wind uplift resistance is measured following the guideline ETAG No. 006, edition 03.2000, amended 11.2012.

Finally, with respect to the thermal and/or acoustic insulation system it is of advantage that the bulk density of the insulation element layer being in contact with the lining element is 40% up to 100%, preferably 50% up to 75% higher than the bulk density of the layer being oriented opposite the lining element. By using a two-layered insulation element one of the advantages as already described before is that the adhesive only penetrates with small amounts into the insulation element. On the other hand, using a second layer of less bulk density allows to equalize rough surfaces of the roof or another outside surface of the building.

According to a further feature of the thermal and/or acoustic system a second major surface of the insulation element being oriented parallel to the major surface of the insulation element is free of protrusions, especially flights, and cavities thereby being planar. Such an insulation element therefore provides a planar major surface being oriented within the system towards a structural support of the building. The structural support typically being a continuous steel or concrete deck, and if required additionally comprising a vapor control layer. An insulation element comprising a second major surface according to this further feature having a better ability to be glued to the surface of the structural support respectively the surface of a vapor control layer, in particular a bituminous vapor control layer.

Another aspect of the disclosure is a method for producing a thermal and/or acoustic insulation system as waterproofing for a flat or flat inclined outside surface of a building. This method is characterized in that protrusions, especially flights and cavities are removed from the major surface so that the major surface is planar. Afterwards, the insulation element is placed on the outside surface of the building with the planar surface being oriented distant from the outer surface of the building. In the next step the lining element is placed on the planar surface of the insulation element with its layer of glue being at least partly in contact with the major surface of the insulation element and whereby the glue is heated up to its melting temperature by using a heat source being in direct contact with the glue. Therefore, the heating of the lining material can be very much restricted, thus saving energy, as the glue or adhesive is directly heated and afterwards brought into contact with the insulation element.

Preferably, the lining element is placed at a roll on top of the planar surface of the insulation element whereby an upper area of the roll is heated up to the melting temperature of the glue and whereby the roll is then scrolled until the heated upper area gets into contact with the planar surface of the insulation. In the next step a next area of the lining element is heated up to be connected with the insulation element. Compared to the prior art it is avoided that the surface to be brought into contact with the lining element comes into contact with for example an open flame so that the binder in the insulation element which is normally an organic binder is burned and therefore destroyed which reduces the binding forces between the fibers. If the binding forces between the fibers is reduced more fibers are not connected to the insulation elements and give an improper connection of the insulation element to the lining element.

Preferably, the protrusions are removed by sawing and/or grinding from the major surface followed by removing the fibers not bound to the insulation element. The protrusions are removed after the insulation element has left the hardening device by use of a grinding device or a saw. During the process of grinding or sawing a lot of fibers are removed from the insulation element and may remain on the planar surface of the insulation element. These unbound fibers may reduce the connection between the lining element and the insulation element and should therefore be removed by blowing or sucking the fibers not being bound to the insulation element thereby cleaning the planar surface of the insulation element. This method step has the advantage that the connection between the insulation element and the lining element can be achieved by using less adhesive or glue.

According to a further feature of the method according to the disclosure the lining element is connected to the insulation element on at least 70%, preferably on at least 80% of the planar surface of the insulation element. Furthermore, the lining element is connected to an insulation element having at least two layers of different bulk densities whereby the layer with the higher bulk density is in contact with the lining element.

Finally, according to a further embodiment of the disclosure the lining element is connected to a planar surface of the insulation element in which the fibers are mostly oriented perpendicular or at least inclined to the planar surface of the insulation element. This feature has the advantage that the lining element is fixed to fibers within the insulation element being more or less oriented perpendicular to the planar surface and thereby providing a higher tensile strength to the insulation element and thus the resulting peeling strength. According to the disclosure the protrusions in the area of one major surface of the insulation elements are removed by cutting or grinding these areas of protrusions. It is of advantage to use an insulation element with meandered layers which are compressed in length-wise direction thereby moving most of the fibers into an upright position which means nearly perpendicular to the major surfaces of the insulation element. The insulation element is moved through the hardening device and afterwards the protrusions and also the area of the insulation elements having fibers parallel to at least one major surface are removed by cutting or grinding, so that the insulation element finally has a planar surface with fibers being mostly oriented perpendicular to said major surface which is used for bonding the lining element.

To improve the connection of the insulation element of the thermal and/or acoustic system especially by gluing it is provided a second major surface of the insulation element being oriented parallel to the major surface of the insulation element from which protrusions, especially flights, and cavities are removed thereby being planar.

Such an insulation element therefore provides a planar major surface being oriented within the system towards a structural support of the building. The structural support typically being a continuous steel or concrete deck, and if required additionally comprising a vapor control layer. An insulation element comprising a second major surface according to this further feature having a better ability to be glued to the surface of the structural support respectively the surface of a vapor control layer, in particular a bituminous vapor control layer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
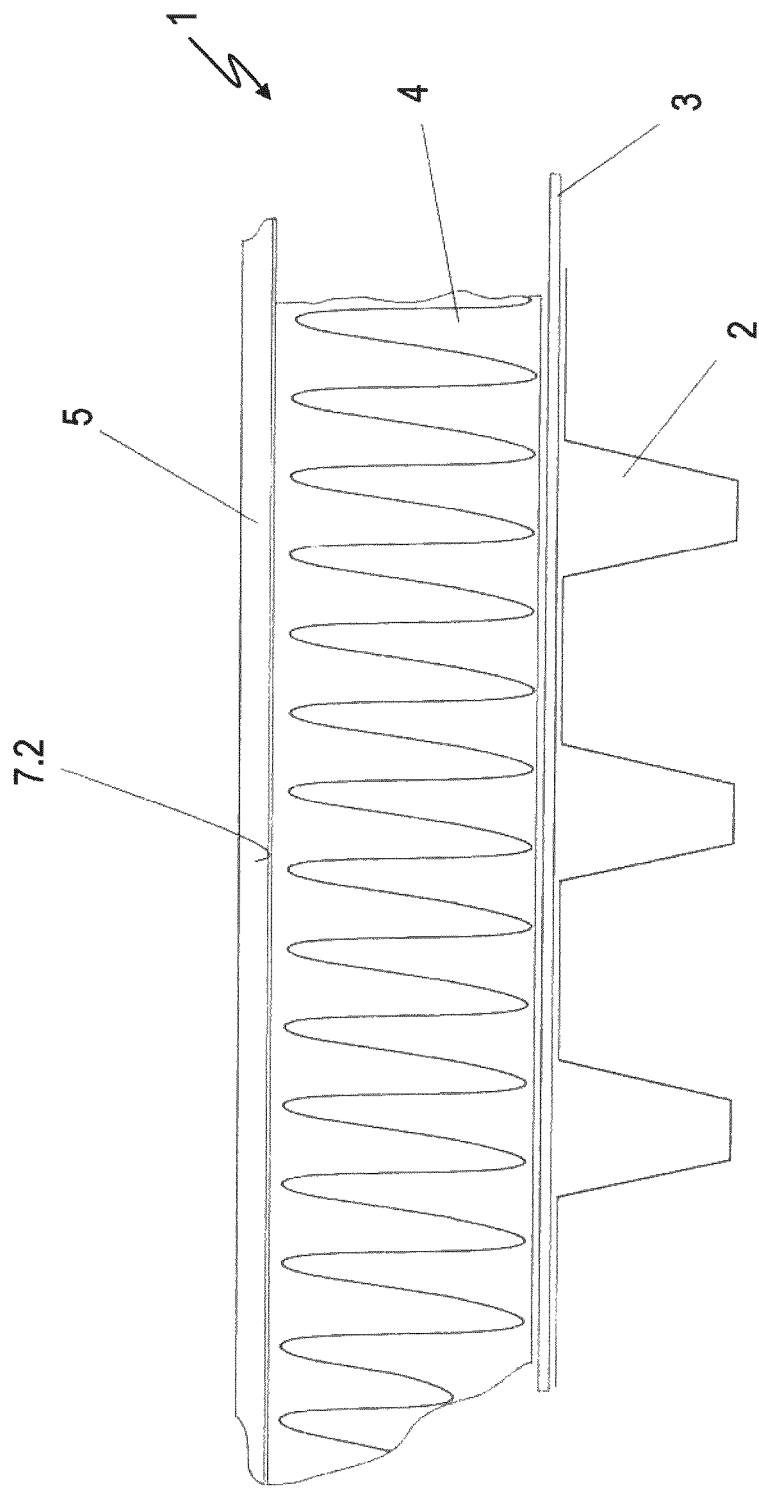
Figure 3:
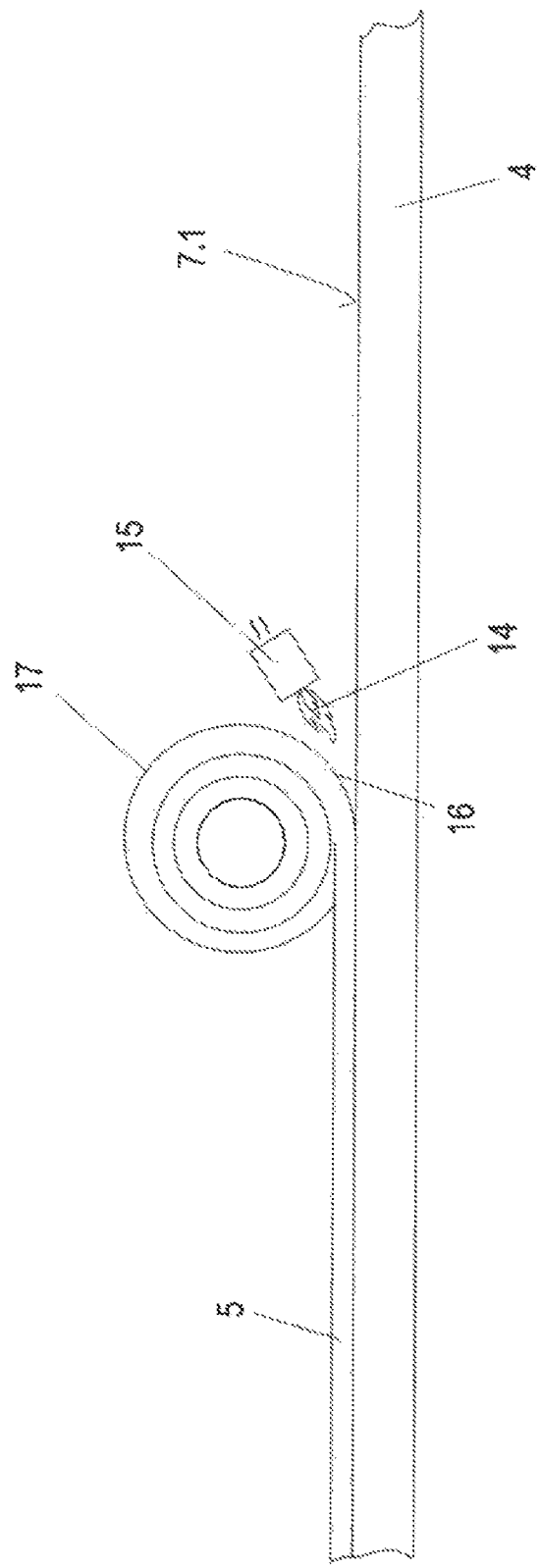
Figure 4:
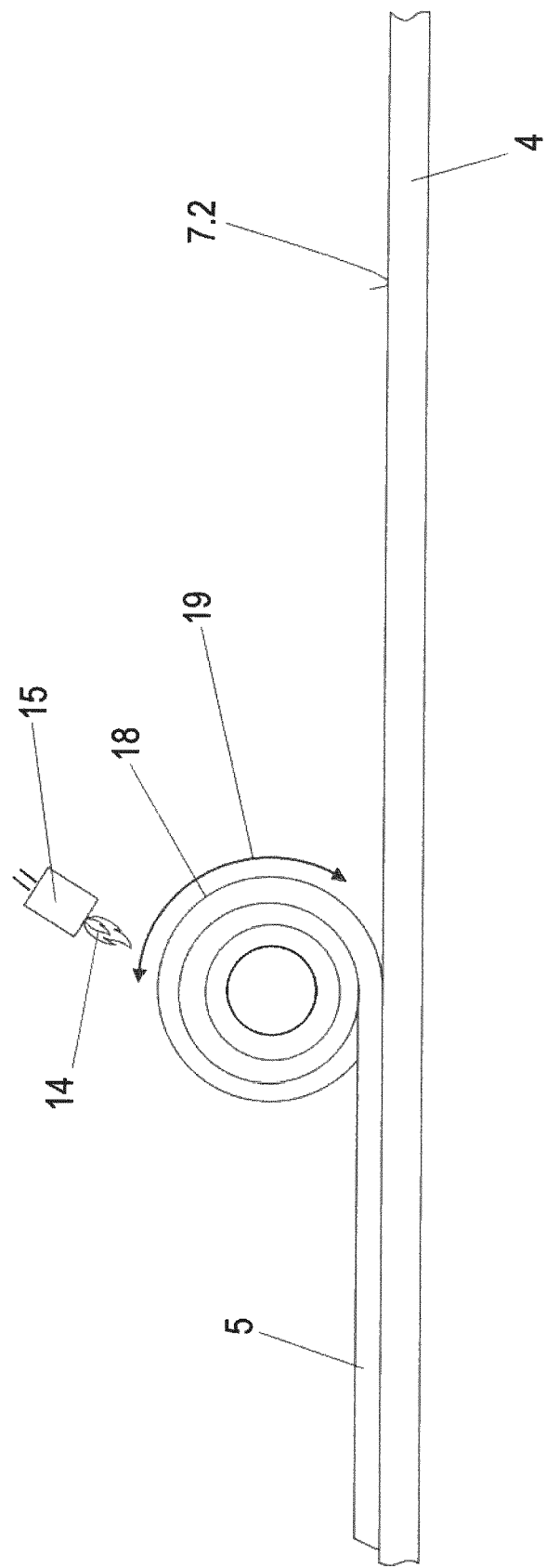
Figure 5:
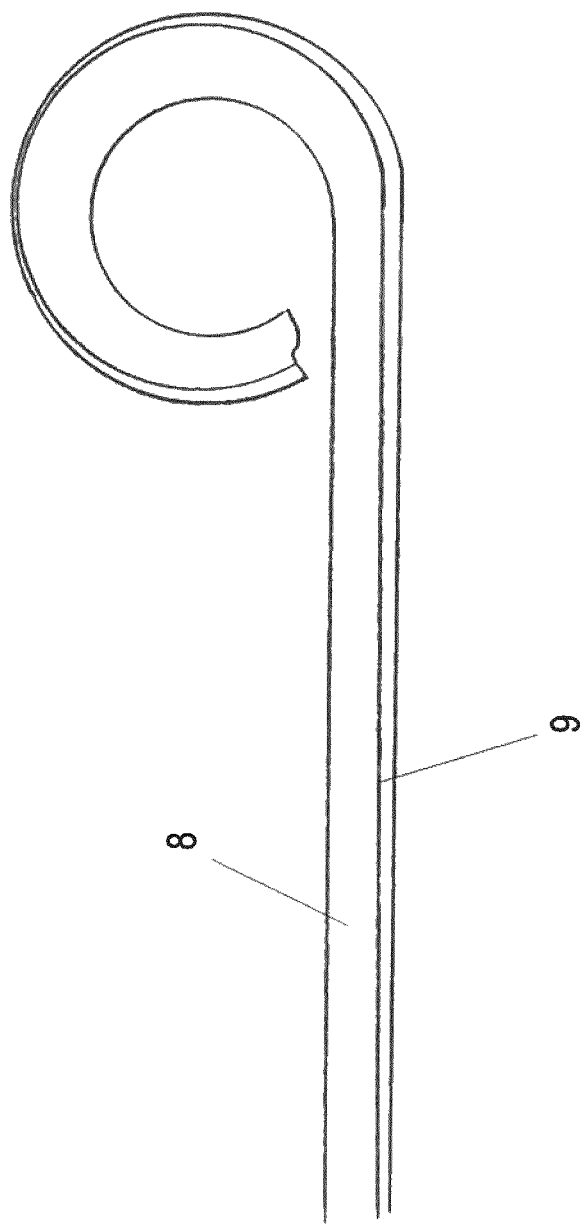

The disclosure is illustrated in the accompanying drawings showing preferred embodiments of the disclosure. The drawings show in FIG. 1 a flat roof according to the prior art in a schematic side view;

FIG. 2 a flat roof according to the disclosure in a schematic side view;

FIG. 3 the installation of a lining element on top of an insulation element according to the prior art;

FIG. 4 the insulation of a lining element on top of an insulation element according to the disclosure;

FIG. 5 a lining element in a schematic side view and

Figure 6:
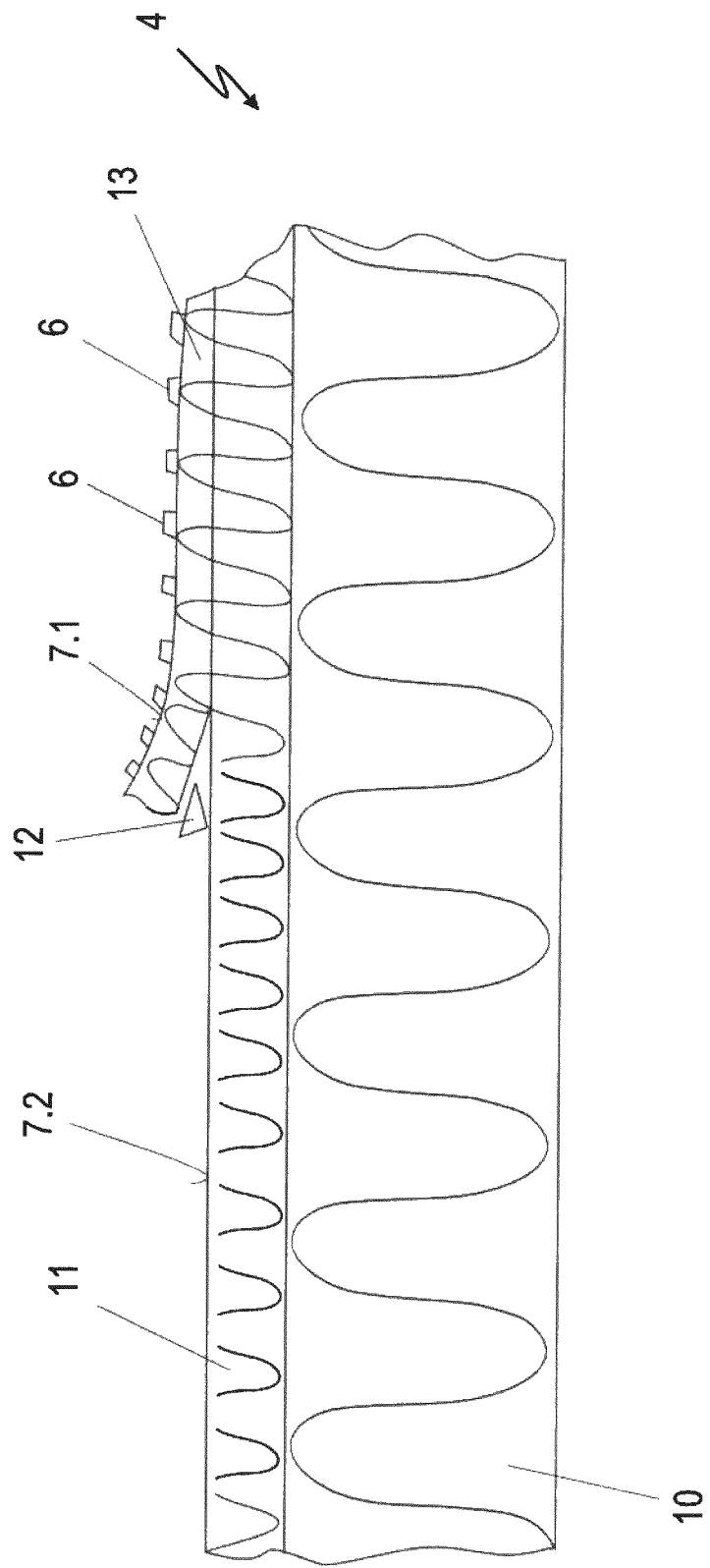

FIG. 6 the preparing of an insulation element before a lining element is applied to the major surface of the insulation element.

Corresponding reference numerals indicate corresponding parts throughout the several views of the drawings.

DETAILED DESCRIPTION

Example embodiments will now be described more fully with reference to the accompanying drawings.

FIG. 1 shows a commonly known prior art thermal and/or acoustic insulation system as waterproofing for a flat roof 1 which consists of a structural support 2, e.g. a continuous steel deck, a vapor control layer 3, a mineral wool insulation element and a lining element 5 being arranged on top of the insulation element 4.

The insulation element 4 consists of mineral fibers, in particular stone wool fibers and an organic binder, for example a phenolic binder with added silane. The binder is hardened in a not shown hardening device thereby producing protrusions 6 on top of a major surface 7 being oriented to the lining element 5.

The lining element 5 is glued to the protrusions 6, thereby not being in contact with the major surface 7.1 between the protrusions 6.

The lining element 5 is made of a bituminous layer which can be heated to a temperature melting the bitumen and thereby connecting the bituminous layer to the protrusions 6. To connect the lining element 5 to the major surface 7.1 a high amount of bitumen has to be inserted into the areas between the protrusions 6 to improve the connection between the insulation element 4 and the lining element 5.

FIG. 2 shows the flat roof 1 in a schematic side view according to the disclosure. Once again the flat roof 1 consists of a structural support 2 and a vapor control layer 3. The mineral wool insulation element 4 is arranged on top of the vapor control layer 3 which covers the support 2.

The insulation element 4 has a major surface 6 being free of protrusions and/or cavities so that the major surface 7.2 is planar and prepared for fixing the lining element 5 on top of the major surface 7.2.

The lining element 5 which is shown in more detail in FIG. 5 consists of a first layer 8 made of lining material and a second layer 9 made of a glue or an adhesive which is activatable by heat. The second layer 9 therefore comprises a thermal setting adhesive or is made of a thermal setting adhesive. The second layer 9 compared to the first layer 8 is very thin and has a thickness of approximately 0.5 up to 2 mm which makes it possible to activate the thermal setting adhesive in short time with less heating energy, compared and contrary to the prior art bitumen membranes comprising relatively thick second layer of more than 3 mm of bitumen which require a substantial amount of heat to make the bitumen reactive and sticky.

The insulation element 4 used for the thermal and/or acoustic insulation system according to the disclosure is shown in FIG. 6 in more detail. According to FIG. 6 the insulation element 4 has two layers 10 and 11 of different density and thickness. It can be seen from FIG. 6 that the layer 11 has a lower density and a higher thickness compared to the layer 10.

Furthermore, FIG. 6 shows a blade 12 which is used to remove a thin layer 13 of the layer 11. By removing the layer 13 a part of the major surface 7.1 being equipped with protrusions 6, namely flights is removed as well as a part of the layer 11 in which the fibers are oriented parallel to the major surface 7.1. In consequence, the major fiber orientation in layer 11 is perpendicular to the major surface 7.1 avoiding fibers being oriented parallel to the major surface 7.2.

Finally, FIGS. 3 and 4 show a method of applying the lining element 5 to the major surface 7.1 or 7.2 of the insulation element 4.

FIG. 3 represents the prior art and shows that a flame 14 provided by a burner 15, e.g. a gas torch, is directed into a crotch 16 being arranged between a roll 17 of a traditional bituminous lining element 5 and the major surface 7.1 of the insulation element 4. Using this flame 14 in the crotch 16 means to heat up the major surface 7.1 of the insulation element 4 and thereby burn the binder between the fibers at least in the area of the major surface 7.1. The organic binder between the fibers can already be destroyed by temperatures of approximately 200° C. Destroying the binder means that a part of the fibers of the insulation element 4 are not bound any longer and therefore reduce the peel off strength of the insulation element 4. In consequence, a lot of adhesive of the lining element 5 is to be used to connect the lining element 5 to the insulation element 4 thereby connecting the unbound fibers into the surface area of the major surface 7.1 of the insulation element 4 in that the fibers are captured in the adhesive. I.e., this way of heating the prior art lining element 5 however is necessary to liquefy a sufficient amount of adhesive or bitumen to ensure a proper connection.

In contrast to that, according to the disclosure the flame 14 of a burner 15 is used to only heat up an area 18 of the surface of the lining element 5 being arranged as a roll 17 on top of the planar surface 7.2 of the insulation element 4. The area 18 which is useful to be heated up is shown in FIG. 4 as an arrow 19. It can be seen that the flame 14 does not get into contact with the major surface 7.2 of the insulation element 4 thereby preventing the destruction of binder between the fibers.

After the area 18 of the roll 17 is heated up to the melting temperature of the adhesive the roll 17 is scrolled partly for example in the length of arrow 19 to connect the sticky adhesive to the major surface 7.2 of the insulation element 4.

Of course, on top of a roof several insulation elements 4 are used side by side and it will be necessary to use lining elements 5 being arranged side by side and overlapping partly. Therefore, the adhesive used for connecting the lining element 5 to the insulation element 4 is also useable for connecting two lining elements 5 being arranged side by side and overlapping each other partly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A thermal and/or acoustic insulation system as waterproofing for a flat or flat inclined outside surface of a building, consisting of at least one insulation element made of mineral wool and having a major surface, and a lining element consisting of at least a first layer made of lining material and a second layer made of a glue activatable by heat and oriented to the major surface of the insulation element, whereby the major surface of the insulation element is free of protrusions and cavities thereby being planar and whereby an area connection between the insulation element and the lining element is at least 70% of the major surface area of the insulation element.

2. The thermal and/or acoustic insulation system according to claim 1,
wherein
the insulation element has at least two layers of different bulk density whereby the layer with the higher bulk density is in contact with the lining element.

3. The thermal and/or acoustic insulation system according to claim 1,
wherein
the area connection between the insulation element and the lining element covers 90% up to 99% of the major surface area of the insulation element.

4. The thermal and/or acoustic insulation system according to claim 1,
wherein
a peel off strength perpendicular to the major surface of the insulation element of at least 15 [N/50 mm].

5. The thermal and/or acoustic insulation system according to claim 1,
wherein
a wind uplift resistance of at least 3.500 N/m$^2$.

6. The thermal and/or acoustic insulation system according to claim 2,
wherein
the bulk density of the insulation element layer being in contact with the lining element is 40% up to 100% higher than the bulk density of the layer being oriented opposite the lining element.

7. The thermal and/or acoustic insulation system according to claim 1,
wherein
a second major surface of the insulation element being oriented parallel to the major surface of the insulation element is free of protrusions and cavities thereby being planar.

8. A method for producing a thermal and/or acoustic insulation system as waterproofing for a flat or flat inclined outside surface of a building consisting of at least one insulation element made of mineral wool and having a major surface, and a lining element consisting of at least a first layer made of lining material and a second layer made of a glue activatable by heat and oriented to the major surface of the insulation element, whereby protrusions and cavities are removed from the major surface of the insulation element so that the major surface is planar, whereby the insulation element is placed on the outside surface of the building with the planar surface being oriented distant from the outside surface of the building, whereby the lining element is placed on the planar surface of the insulation element with its layer of glue being at least partly in contact with the major surface of the insulation element and whereby the glue is heated up to its melting temperature.

9. The method according to claim 8,
wherein
the lining element is placed at a roll on top of the planar surface of the insulation element whereby an upper area of the roll is heated up to the melting temperature and whereby the roll is then scrolled until the heated upper area gets into contact with the planar surface of the insulation element.

10. The method according to claim 8,
wherein
any protrusions of the major surface of the insulation element are removed by sawing and/or grinding followed by removing the fibers not being bound to the insulation element.

11. The method according to claim 8,
wherein
the lining element is connected to the insulation element on at least 70% of the planar surface area of the insulation element.

12. The method according to claim 8,
wherein
the lining element is connected to an insulation element having at least two layers of different bulk densities whereby the layer with the higher bulk density is in contact with the lining element.

13. The method according to claim 8,
wherein
the lining element is connected to a planar surface of the insulation element in which the fibers are mostly oriented perpendicular or at least inclined to the planar surface of the insulation elements.

14. The method according to claim 8,
wherein
protrusions, especially flights, and cavities are removed from a second major surface of the insulation element being oriented parallel to the major surface of the insulation element so that the second major surface is planar.

\* \* \* \* \*